United States Patent [19]

Ohno et al.

[11] Patent Number: 5,022,492
[45] Date of Patent: Jun. 11, 1991

[54] FLUID-BEARING APPARATUS

[75] Inventors: Hideaki Ohno; Takao Yoshitugu, both of Osaka; Chuuryoh Yoshida, Amagasaki; Hideo Matsumoto, Osaka, all of Japan

[73] Assignee: Matsushita Electric Industrial Co., Ltd., Osaka, Japan

[21] Appl. No.: 339,324

[22] Filed: Apr. 17, 1989

[30] Foreign Application Priority Data

Apr. 20, 1988 [JP] Japan .................. 63-97029

[51] Int. Cl.$^5$ ........................................... F16C 32/06
[52] U.S. Cl. ...................................... 184/5; 252/56 S
[58] Field of Search ................... 184/5, 6.18, 100; 384/398; 560/198; 260/410.7; 252/56 S

[56] References Cited

U.S. PATENT DOCUMENTS

| 4,122,023 | 10/1978 | Yasui et al. | 585/18 |
| 4,175,046 | 11/1979 | Coant et al. | 252/56 S |
| 4,283,296 | 8/1981 | Nebzydoski et al. | 252/56 S |
| 4,440,657 | 4/1984 | Metro et al. | 252/56 S |
| 4,547,081 | 10/1985 | Tanaka et al. | 384/107 |
| 4,573,807 | 3/1986 | Asada et al. | 384/100 |
| 4,706,144 | 11/1987 | Asada et al. | 360/107 |

Primary Examiner—Ira S. Lazarus
Assistant Examiner—Alan B. Cariaso
Attorney, Agent, or Firm—Panitch Schwarze Jacobs & Nadel

[57] ABSTRACT

A fluid-bearing apparatus comprising a shaft, a sleeve, dynamic pressure-generating grooves that are provided on either the shaft or on the bearing surface of the sleeve that faces the shaft, wherein a single-component composition is used as the base oil of a lubricant, and accordingly segregation of the lubricant components does not occur, thereby preventing both the development of cavitation arising from decreases in the local vapor pressure and the washing away of the lubricant to the outside of the region of the bearing resulting from the enhancement of the gradient of surface tension of the lubricant.

2 Claims, 3 Drawing Sheets

FLUID-BEARING APPARATUS

BACKGROUND OF THE INVENTION

1. Field of the Invention

This invention relates to a dynamic pressure-type fluid-bearing apparatus and a polygon mirror-scanner unit with the fluid-bearing apparatus therein.

2. Description of the Prior Art

As the base oil of lubricating oils used in a conventional dynamic pressure-type fluid-bearing apparatus, there have been used synthetic hydrocarbons such as polybutene, poly-α-olephine, or the like. The reasons for their use are that these oils are not easily oxidized and do not easily rust metals; moreover, they absorb the scattering of the properties of bearings at the time of the mass-production of the bearing.

FIG. 1 shows a radial bearing that is an example of the dynamic pressure-type fluid-bearing apparatus in general. The radial bearing has a shaft 1 and a sleeve 2. A lubricant 3 is kept in the space between the shaft 1 and the sleeve 2 by capillary attraction. The tapers 2a of the sleeve 2, which define the bearing region with an effective width W, are provided for the purpose of keeping the lubricant 3 in the bearing region. Reference numeral 1a is a dynamic pressure-generating groove.

This dynamic pressure-type fluid-bearing apparatus operates as follows. A driving means (not shown) rotates either the shaft 1 or the sleeve 2. When the rotation begins, the pumping power of a dynamic pressure-generating groove 1a causes the centering of the shaft 1 with respect to the sleeve 2, so that the shaft 1 and the sleeve 2 are not in contact. The lubricant 3 undergoes shearing stress in the space between the shaft 1 and the sleeve 2, giving rise to heat. Because the shearing stress is the highest in the region of the bearing with the effective width W that is defined by the tapers 2a of the sleeve 2, the said region of the bearing with the effective width W becomes hotter than other regions. The heat produced therein is transferred via the shaft 1 and the sleeve 2 to the surroundings. When the amount of heat arising from the shearing stress and the amount of heat radiating from the entire dynamic pressure-type fluid-bearing apparatus are maintained at a certain level, there is a gradient of heat in the shaft 1 and the sleeve 2. In the same way, there is a temperature difference in the lubricant 3 between the region of the bearing with the effective width W and the region in the vicinity of the boundary of air and liquid. For that reason, a temperature gradient arises in the lubricant 3, as well. The occurrence of a temperature gradient causes a gradient in the surface tension, resulting in tangential stresses that correspond to the difference in surface tension, so that a flow begins in the lubricant 3. The direction of this flow is, as shown by the arrows in FIG. 2, from the direction of lower surface tension to the direction of higher surface tension. That is, the flow moves from the central area of the effective width W of the bearing to the outside directions.

The above-mentioned base oil of lubricating oils has a relatively large range of molecular weights. Moreover, the surface tension of the components of high molecular weight is larger than the mean surface tension of the lubricant overall, and the surface tension of the components of lower molecular weight is smaller than the mean surface tension of the lubricant overall, so that the components of high molecular weight segregate in the direction of low temperature and the components of low molecular weight segregate in the direction of high temperature.

Because of this phenomenon, the viscosity of the lubricant 3 in the region of the effective width W of the bearing decreases, causing a decrease in the stiffness of the bearing, which brings about swinging and eccentricity. This enhances the generation of heat still more, and both the temperature gradient and the gradient in the surface tension increase. The vapor pressure of the components of low molecular weight that have segregated to the central area of the bearing is lower than that of the lubricant overall, so cavitation occurs. Moreover, because of the increase in the gradient of surface tension, the lubricant is washed away toward the outside of the bearing, causing a deterioration of the properties of the bearing. In the worst situation, seizing occurs.

SUMMARY OF THE INVENTION

The dynamic pressure-type fluid-bearing of this invention, which overcomes the above-discussed and numerous other disadvantages and deficiencies of the prior art, comprises a shaft, a sleeve that receives said shaft therein, dynamic pressure-generating grooves that are formed either on said shaft or on said sleeve, and a fluid lubricant that is oil, grease, or the like, wherein a single-component composition is used as the base oil of said lubricant.

In a preferred embodiment, the base oil is one selected from the group consisting of squalene, trimethylolpropanetriheptylate, trimethylolpropanetrioctanate, and trimethylolpropanetrinonanate.

In a preferred embodiment, the above-mentioned fluid-bearing apparatus is incorporated into a polygon mirror-scanner unit.

The lubricant can contain, in addition to a single-component composition that is used as the base oil of the lubricant, any of the well-known additives such as antioxidants, oil enhancers, extreme-pressure additives, antirusting agents, or the like, but it is preferable that the amounts of additives added should be the minimum amounts to give the desired effect.

The base oil of the lubricant used in this invention is composed of a single-component composition, and does not have a range of molecular weights, so that there can be no segregation of the components of the lubricant between the region of the bearing of the effective width and the region of the bearing in the vicinity of the air-liquid boundary, thereby preventing both the development of cavitation arising from decreases in the local vapor pressure and the washing away of the lubricant to the outside of the bearing region resulting from the enhancement of the gradient of surface tension of the lubricant.

Thus, the invention described herein makes possible the objectives of (1) providing a fluid-bearing apparatus that prevents both the occurrence of cavitation and the washing away of lubricant to the outside of the bearing region; and (2) providing a polygon mirror-scanner unit into which the fluid-bearing apparatus is incorporated.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
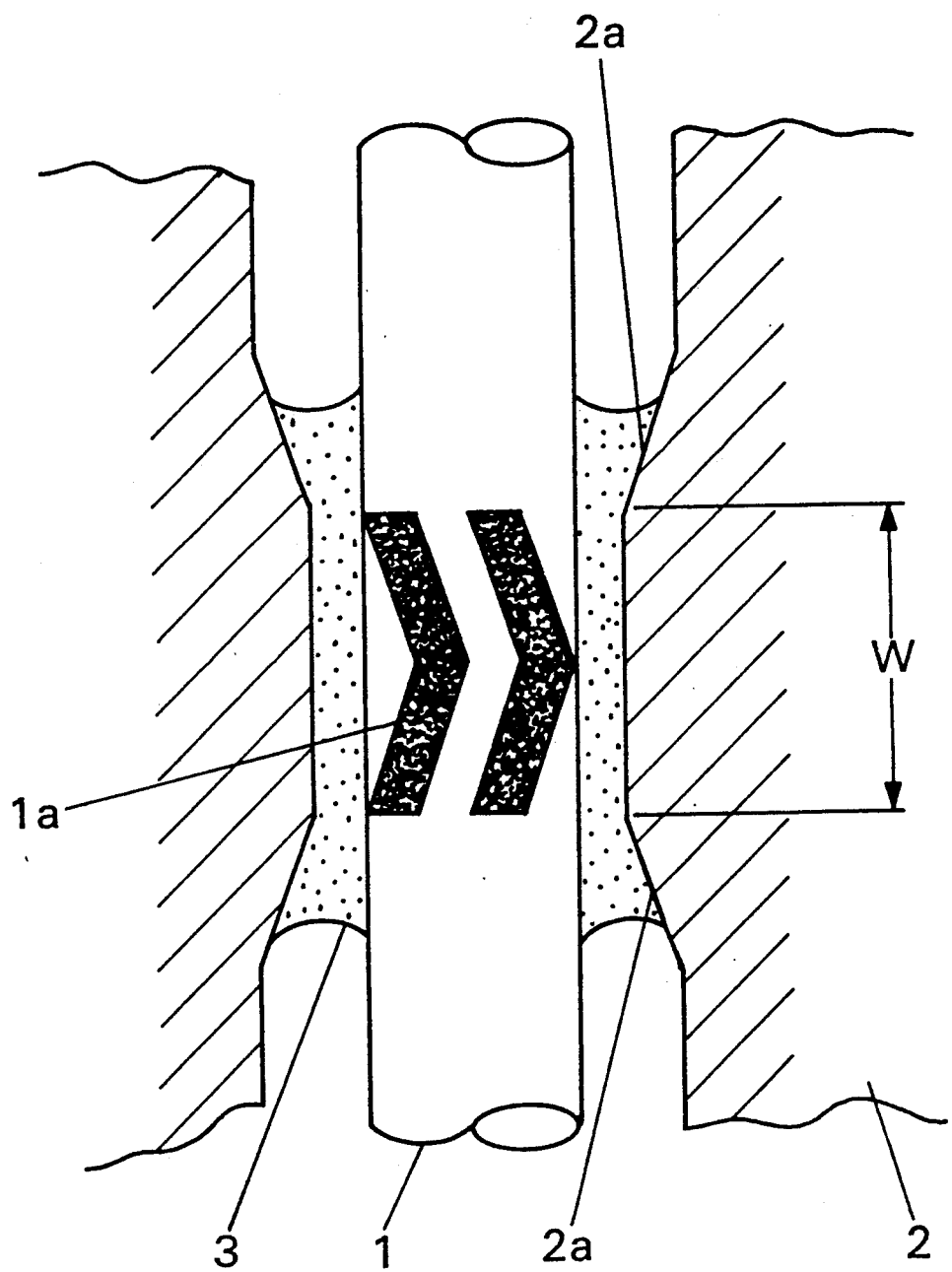
FIG. 1 is a schematic diagram showing the mechanism of a radial bearing of this invention and a conventional radial bearing.
Figure 2:
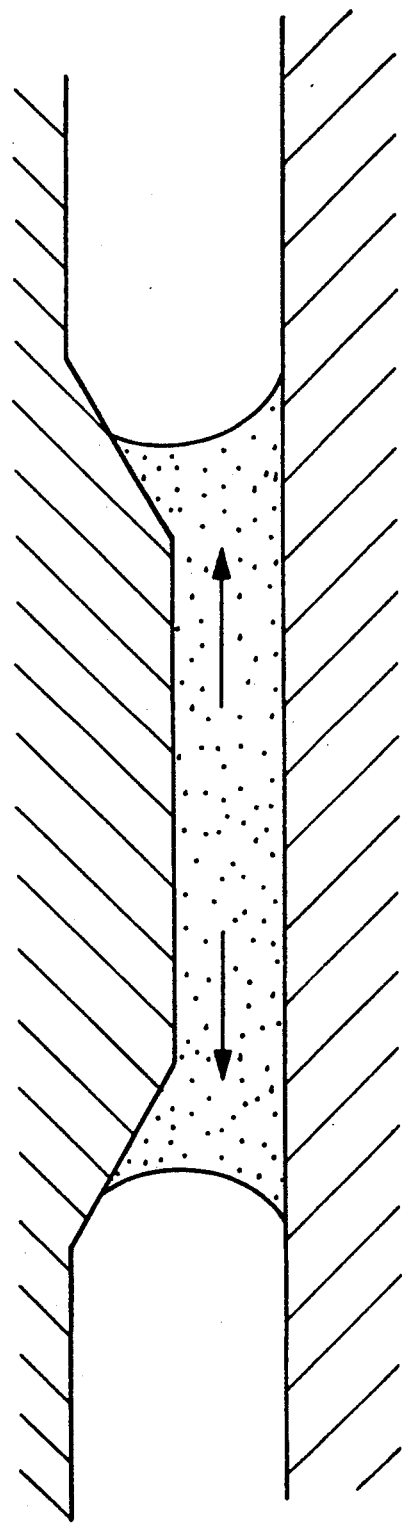
FIG. 2 is a schematic diagram showing the direction of a flow of lubricant at the time of the occurrence of a temperature gradient and a gradient in surface tension in the bearing of FIG. 1.

FIG. 1 shows a fluid-bearing apparatus of this invention, the mechanism of which was described in the "Description of the prior art", so the description thereof is omitted here. In the example of this invention, the materials used in the construction and the thermal conductivity of these materials are as follows. The shaft 1 is made of stainless steel with a thermal conductivity of 25 kcal/m.hr.°C., and the sleeve 2 is made of a copper alloy with a thermal conductivity of 85 kcal/m hr.°C. Examples and comparative examples in which a variety of substances are used as the lubricant 3 will be given below.

EXAMPLE 1

To prepare the lubricant, 0.1 part by weight of 2,6-di-t-butyl-4-methylphenol was added to 100 parts by weight of squalene, the base oil.

EXAMPLE 2

To prepare the lubricant, 0.1 part by weight of 2,6-di-t-butyl-4-methylphenol was added to 100 parts by weight of trimethylolpropanetriheptylate, the base oil.

EXAMPLE 3

To prepare the lubricant, 0.1 part by weight of 2,6-di-t-butyl-4-methylphenol was added to 100 parts by weight of trimethylolpropanetrioctanate, the base oil.

EXAMPLE 4

To prepare a lubricant, 0.1 part by weight of 2,6-di-t-butyl-4-methylphenol was added to 100 parts by weight of trimethylolpropanetrinonanate, the base oil.

COMPARATIVE EXAMPLE 1

To prepare the lubricant, 0.1 part by weight of 2,6-di-t-butyl-4-methylphenol was added to 100 parts by weight of polybutene, the base oil, with a kinematic viscosity of 19 cst at 40° C.

COMPARATIVE EXAMPLE 2

To prepare the lubricant, 0.1 part by weight of 2,6-di-t-butyl-4-methylphenol was added to 100 parts by weight of poly-α-olefin, the base oil, with a kinematic viscosity of 19 cst at 40° C.

COMPARATIVE EXAMPLE 3

To prepare the lubricant, 0.1 part by weight of 2,6-di-t-butyl-4-methylphenol was added to the base oil, which is composed of 53 parts by weight of trimethylolpropanetriheptylate and 47 parts by weight of trimethylolpropanetrinonanate.

The properties of the examples and comparative examples mentioned above are shown in Table 1.

The bearing that uses each of the lubricants prepared in the above examples and comparative examples was operated at 20,000 rpm in an incubation bath at 40° C., and the time taken for abnormal vibration to develop is shown in Table 2. Abnormal vibration is a swinging vibration that occurs at the frequency of about half the rotation number, at one whorl or at ½ whorl. It occurs when there is cavitation or when there is a decline in the stiffness of the bearing because of the washing away of the lubricant.

In the fluid-bearing apparatus of this invention that uses oil or grease as the fluid, the effects of using as the lubricant a base oil that is composed of a single-component composition are clear from the comparison of the results of Example 1 and those of Comparative Examples 1 and 2, and also from a comparison of the results of Example 3 with the results of Comparative Example 3.

TABLE 1

| Samples | Kinetic viscosity (cst) | | Surface tension (dyn/cm) |
| --- | --- | --- | --- |
| | 40° C. | 100° C. | |
| Example 1 | 19.0 | 4.12 | 29.0 |
| Example 2 | 13.8 | 3.45 | 30.2 |
| Example 3 | 16.8 | 3.95 | 30.8 |
| Example 4 | 20.6 | 4.62 | 30.8 |
| Comparative Example 1 | 19.2 | 4.08 | 28.5 |
| Comparative Example 2 | 17.1 | 3.70 | 28.8 |
| Comparative Example 3 | 16.7 | 3.95 | 30.5 |

TABLE 2

| Samples | Time for abnormal vibration to develop (hrs) |
| --- | --- |
| Example 1 | 960 |
| Example 2 | 1800 |
| Example 3 | More than 2000 |
| Example 4 | More than 2000 |
| Comparative Example 1 | 45 |
| Comparative Example 2 | 120 |
| Comparative Example 3 | 430 |

EXAMPLE 5

Figure 3:
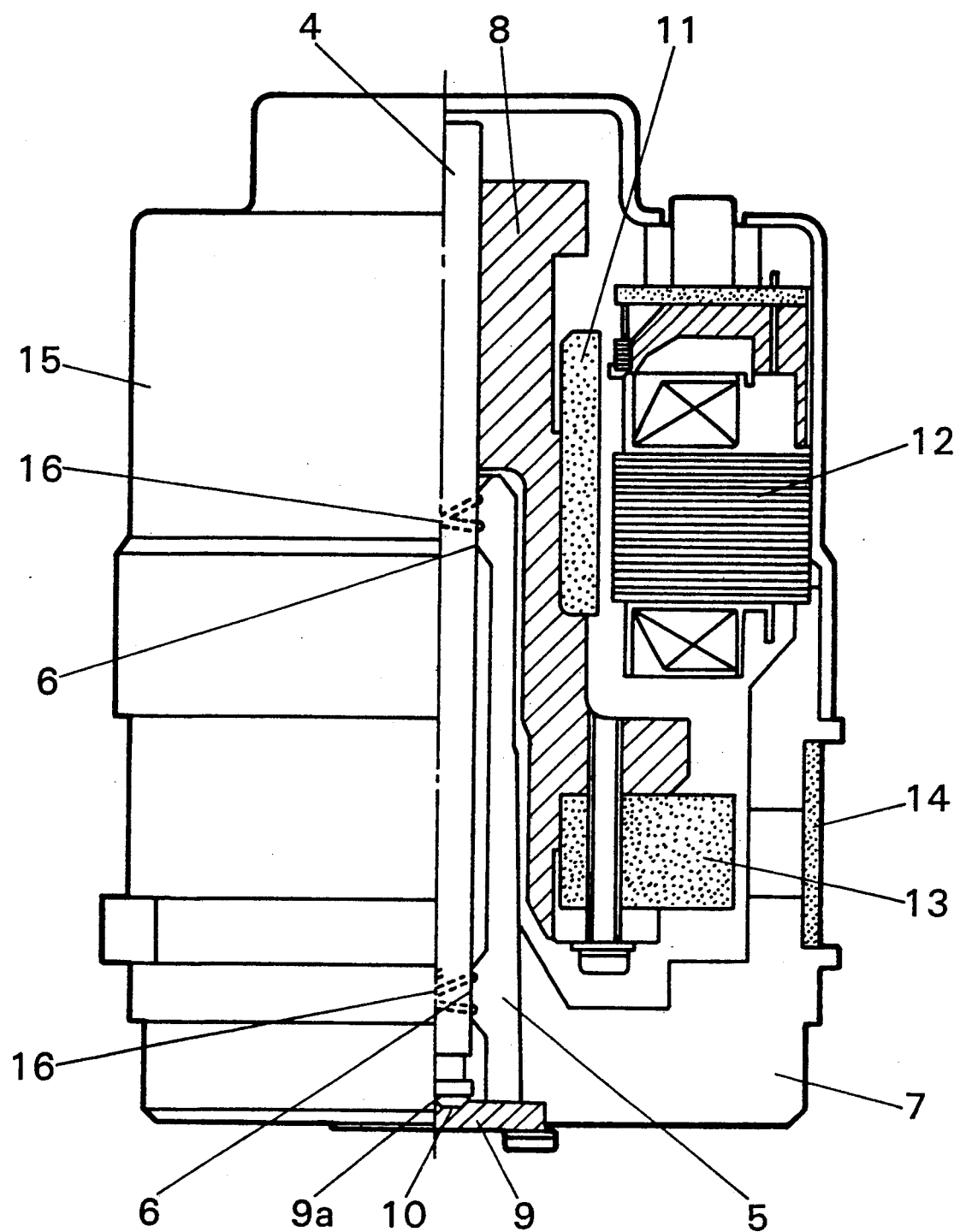
FIG. 3 is a sectional side view showing a polygon mirror-scanner unit into which the fluid-bearing apparatus of this invention is incorporated.

FIG. 3 shows a polygon mirror-scanner unit into which the above-mentioned fluid-bearing apparatus is incorporated. The shaft 4 is provided in a rotor 8 that has a cylindrical-shaped motor magnet 11 on its outer surface. The sleeve 5 is provided in a bracket 7. At the bottom surface of the bracket 7, a thrust-board 9, which has a spiral-shaped dynamic pressure-generating groove 9a, is installed so as to be at right angles with respect to the bearing opening of the sleeve 5. A herringbone-patterned dynamic pressure-generating groove 16 is provided either on the exterior surface of the shaft 4 or on the interior surface of the sleeve 5. A lubricant 6 is held in the herringbone-patterned dynamic pressure-generating groove 16 that is positioned between the shaft 4 and the sleeve 5. A lubricating grease 10 is held in the spiral-shaped dynamic-pressure-generating groove 9a. Reference numeral 13 is a polygon mirror that is disposed outside of the rotor 8. Reference numerals 12, 14 and 15, respectively, are a motor stator, a transparent-glass window and a cover.

The features of this example are as follows. The shaft 4 is made of stainless steel with a thermal conductivity of 25 kcal/m.hr.°C. and the sleeve 5 is made of a copper alloy with a thermal conductivity of 85 kcal/m.hr.°C.

The lubricant 6 comprises 100 parts by weight of trimethylolpropanetrioctanate, which is a single-component composition, as the base oil, and 0.5 part by weight of additives that include well-known antioxidants and anticorrosives. The lubricating grease 10 comprises 100 parts by weight of trimethylolpropanetri-2-ethyl hexanoates, which is a single-component composition, for the base oil, and 10 parts by weight of additives that include well-known thickeners and antioxidants.

As mentioned above, the fluid-bearing apparatus of this invention comprises a shaft, a sleeve receiving the shaft, dynamic pressure-generating grooves formed either on the shaft or on the sleeve, and a fluid lubricant such as oil, grease, etc., wherein a single-component composition is used as the base oil for the said lubricant, and accordingly segregation of the components of the lubricant does not occur, so that both the development of cavitation arising from decreases in the local vapor pressure and the washing away of the lubricant to the outside of the bearing region resulting from the enhancement of the gradient of surface tension of the lubricant can be prevented.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A fluid-bearing apparatus comprising a shaft, a sleeve that receives said shaft therein, dynamic pressure-generating grooves that are formed either on said shaft or on said sleeve, and a fluid lubricant that is oil, grease, or the like, wherein a single-component composition is used as the base oil of said lubricant, said single-component composition being one selected from the group consisting of trimethylolpropane-triheptylate, trimethylolpropanetrioctanate, and trimethyolpropane-trinonanate.

2. A polygon mirror-scanner unit comprising the fluid-bearing apparatus of claim 1 and a polygon mirror that is mounted on a rotor attached to said shaft.

* * * * *